(12) United States Patent
Mercer

(10) Patent No.: US 7,954,614 B2
(45) Date of Patent: Jun. 7, 2011

(54) DRIVE MECHANISM AND METHOD

(75) Inventor: John E. Mercer, Gig Harbor, WA (US)

(73) Assignee: Merlin Technology, Inc., Kent, WA (US)

(*) Notice: Subject to any disclaimer, the term of this patent is extended or adjusted under 35 U.S.C. 154(b) by 706 days.

(21) Appl. No.: 11/939,693

(22) Filed: Nov. 14, 2007

(65) Prior Publication Data

US 2009/0120756 A1 May 14, 2009

(51) Int. Cl.
*F16D 27/01* (2006.01)
*F16D 27/12* (2006.01)
*F16H 3/14* (2006.01)
*F16H 3/32* (2006.01)

(52) U.S. Cl. ............ 192/48.2; 74/335; 74/355; 74/377; 192/51; 192/84.31

(58) Field of Classification Search .................. 192/84.3, 192/84.31
See application file for complete search history.

(56) References Cited

U.S. PATENT DOCUMENTS

| | | | | |
|---|---|---|---|---|
| 180,668 | A | * | 8/1876 | Sorrinson ........................ 74/342 |
| 516,287 | A | * | 3/1894 | Watkins ........................... 74/342 |
| 760,218 | A | * | 5/1904 | Lefinski ........................... 74/355 |
| 1,616,252 | A | * | 2/1927 | Bratvold ........................ 74/355 |
| 1,963,638 | A | | 6/1934 | Wilsing |
| 2,886,149 | A | * | 5/1959 | Baermann ................... 192/84.31 |
| 2,962,143 | A | * | 11/1960 | Heinemann .................. 192/84.3 |
| 2,962,144 | A | * | 11/1960 | Heinemann et al. ....... 192/84.31 |
| 3,240,304 | A | * | 3/1966 | Wickersham ................ 192/84.3 |
| 3,967,790 | A | | 7/1976 | Hess |
| 4,156,817 | A | | 5/1979 | Preece et al. |
| 4,347,006 | A | | 8/1982 | Shakib |
| 4,352,036 | A | | 9/1982 | Kuwako |
| 4,488,073 | A | | 12/1984 | Morishita |
| 4,507,565 | A | | 3/1985 | Hamano |
| 4,520,914 | A | | 6/1985 | Kagiyama et al. |
| 4,534,455 | A | | 8/1985 | Fujikawa |
| 4,572,343 | A | | 2/1986 | Boffelli |
| 4,800,769 | A | | 1/1989 | Rietsch |
| 4,955,853 | A | | 9/1990 | Bausch |
| 5,149,308 | A | | 9/1992 | Nakamura et al. |
| 5,523,636 | A | | 6/1996 | Nelson |
| 5,523,730 | A | | 6/1996 | Van Zeeland |
| 5,609,232 | A | | 3/1997 | Brownfield et al. |
| 5,666,096 | A | | 9/1997 | Van Zeeland |
| 5,765,671 | A | * | 6/1998 | Endo et al. .................... 192/48.2 |
| 5,814,896 | A | | 9/1998 | Araki |
| 5,967,279 | A | | 10/1999 | Itoh et al. |
| 5,994,786 | A | | 11/1999 | Ando et al. |
| 6,223,613 | B1 | * | 5/2001 | Martin ............................ 74/368 |

(Continued)

*Primary Examiner* — Rodney H Bonck
(74) *Attorney, Agent, or Firm* — Pritzkau Patent Group, LLC

(57) ABSTRACT

A drive train is used at least including an input shaft and an output shaft. A clutch member is rotatable by a clutch shaft about an axis of rotation. The clutch shaft is supported for lateral movement along the axis of rotation to move the clutch member to cooperate with the drive train at a first lateral position to cause the output shaft to turn and to move the clutch member to a second lateral position to disengage the output shaft from rotation of the input shaft. A permanent magnet is supported by one end of the clutch shaft and arranged for receiving an external magnetic biasing force along the axis of rotation to selectively move the clutch member between the first and second lateral positions. A traveling shaft can be used to support a selected gear for movement by the permanent magnet to implement transmission and reversing configurations.

38 Claims, 8 Drawing Sheets

U.S. PATENT DOCUMENTS

| | | |
|---|---|---|
| 6,559,569 B2 | 5/2003 | Aoshima |
| 6,561,321 B1 | 5/2003 | Klode et al. |
| 6,710,472 B2 | 3/2004 | Murfin |
| 6,789,438 B2 | 9/2004 | Tanaka et al. |
| 6,844,643 B2 | 1/2005 | Aoshima |
| 6,877,391 B2 * | 4/2005 | Yamamoto ...................... 74/335 |
| 7,017,849 B2 | 3/2006 | Fuchs et al. |
| 2007/0251796 A1 * | 11/2007 | Moshenrose et al. ........ 192/84.3 |

* cited by examiner

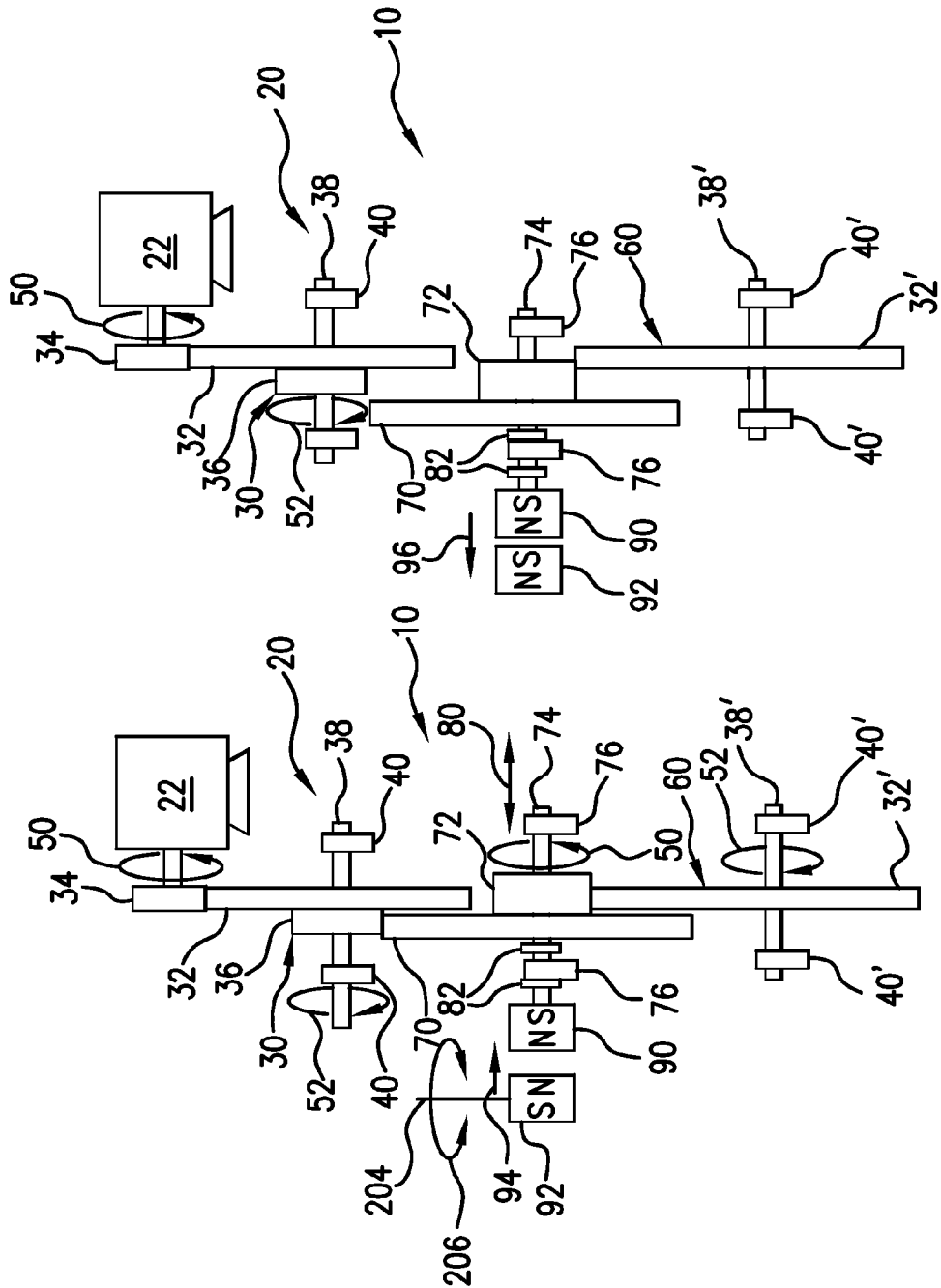

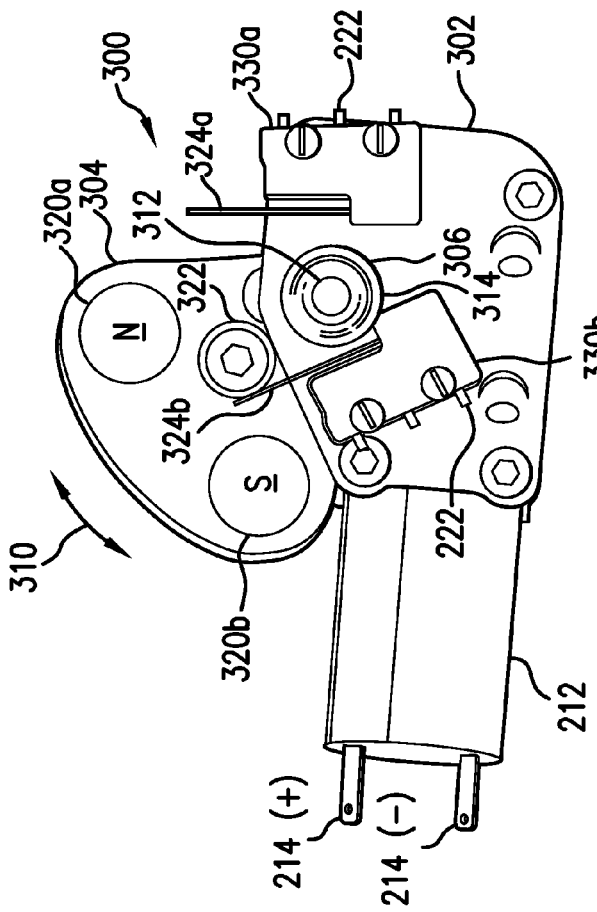
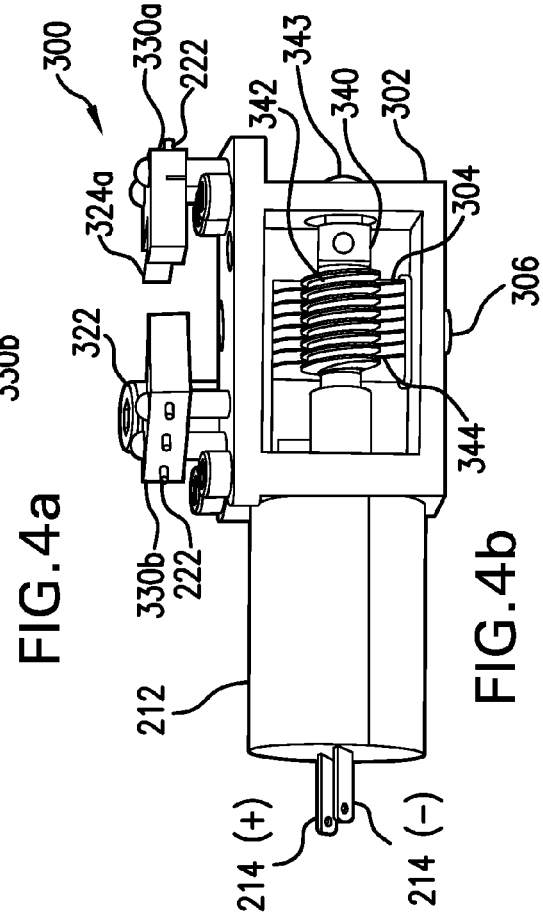

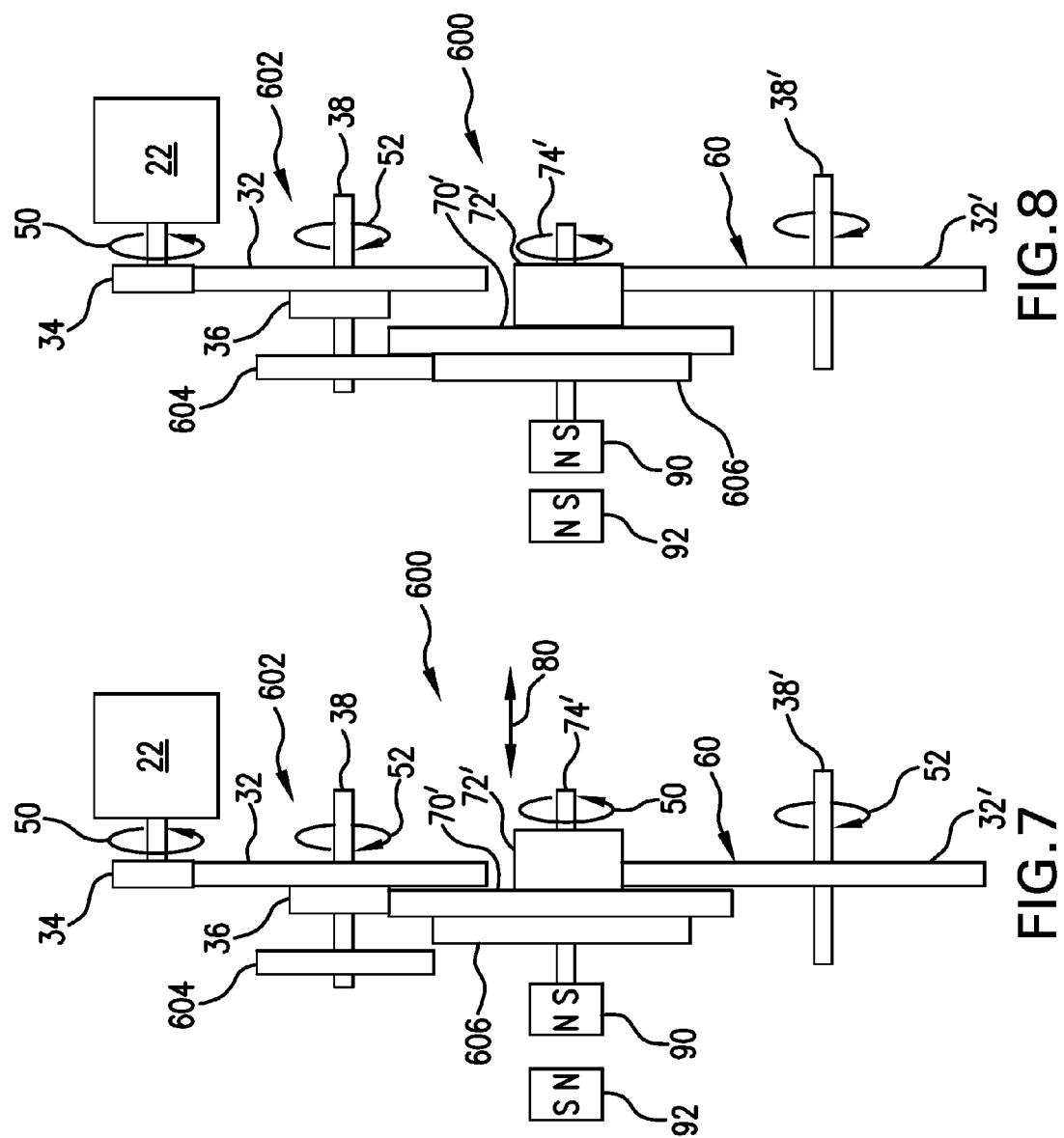

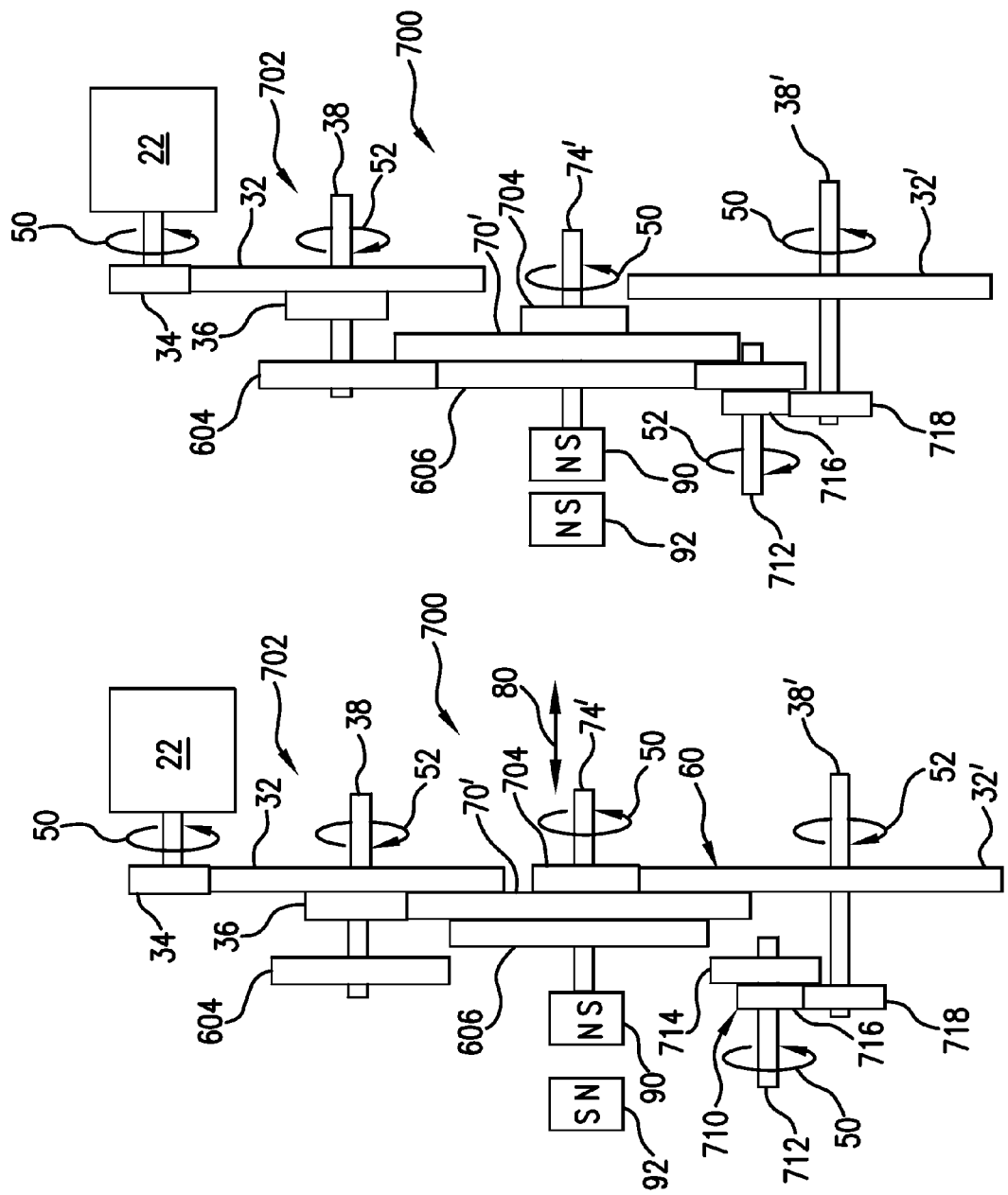

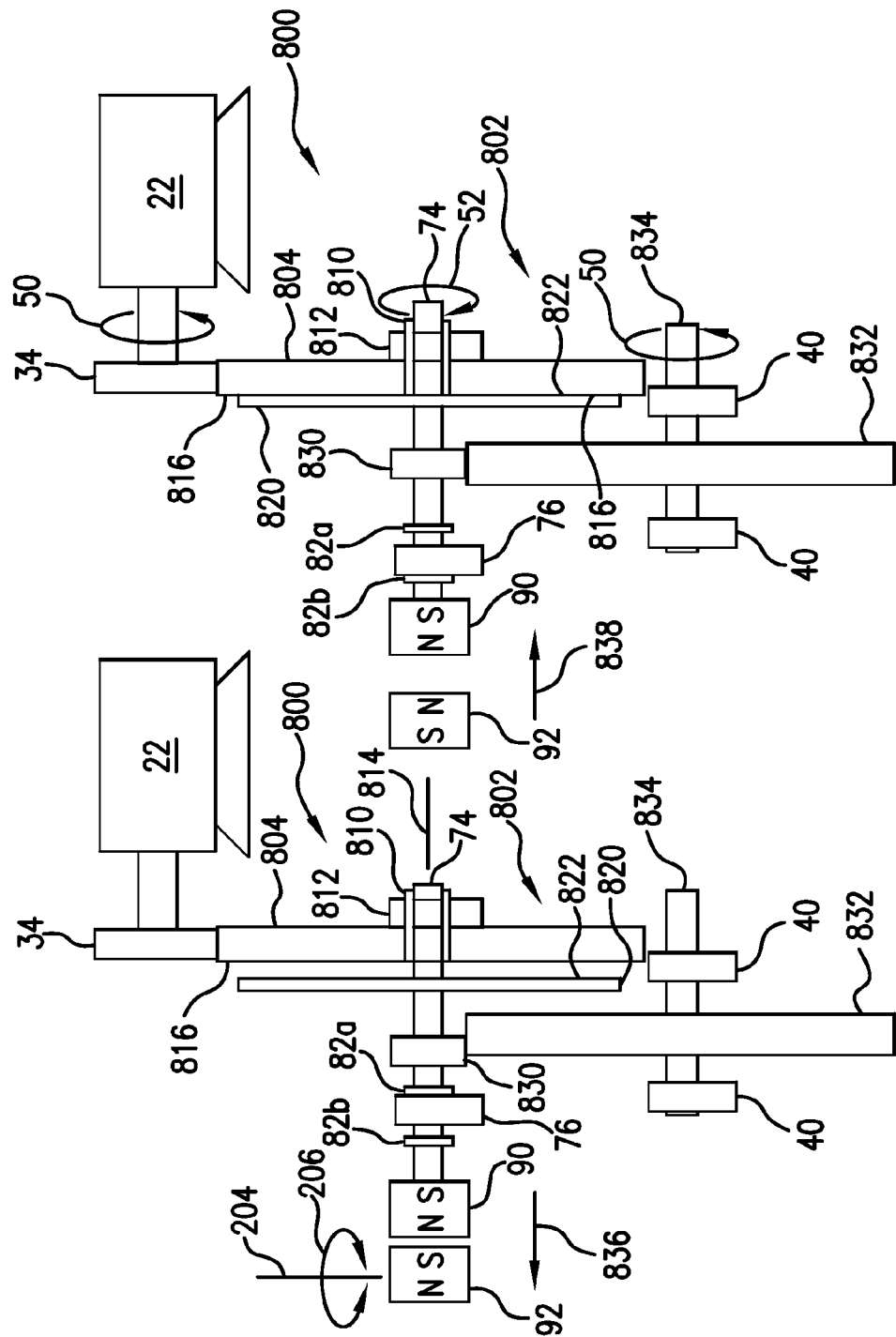

DRIVE MECHANISM AND METHOD

BACKGROUND OF THE INVENTION

The present invention is related generally to the field of a drive mechanism for use in a drive train and, more particularly, to a magnetically actuated drive mechanism.

Drive and clutch arrangements are utilized in a diverse array of applications, for example, whenever it is desired to break a drive engagement between a driving member and a driven member. Many clutch arrangements operate in a way which biases the overall clutch mechanism to an engaged configuration in an absence of external actuation. Other arrangements operate by biasing the overall mechanism to a disengaged configuration. One example of the latter is seen in U.S. Pat. No. 5,609,232 (hereinafter the '232 patent) which uses permanent magnets to bias the mechanism to a disengaged position. The engaged configuration is achieved by using electromagnets to overcome the force that is applied by the permanent magnets. Unfortunately, it is considered that there are at least two concerns that are associated with the type of mechanism that is taught by the '232 patent, and which are shared to a significant extent with the prior art, in general. First, maintaining the engaged configuration requires a continuous current flow in the electromagnet assemblies. Of course, this concern is likely to be shared with any prior art that uses an electromagnet. Thus, there is a continuous power consumption, which may be of concern in applications that rely on a limited source of electrical power such as, for example, battery power. Second, a loss of power in the engaged configuration results in movement from the engaged configuration to the disengaged configuration. Accordingly, the use of the mechanism of the '232 patent may be problematic when there is a need to avoid power failure related changes in the operational status of the clutch mechanism. In the instance of the use of electromagnets, it should be appreciated that a failure of the electromagnets can mimic a power failure related change, likewise resulting in a change in the operational status of the clutch mechanism.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, a drive train is used at least including an input shaft and an output shaft. In one example, a clutch arrangement includes a clutch member that is configured to rotate about an axis of rotation. A clutch shaft supports the clutch member for rotation about the axis of rotation and includes a pair of opposing ends. The clutch shaft is further supported for lateral movement along the axis of rotation such that the clutch member cooperates with the drive train at a first lateral position in a first operational mode to cause the output shaft to turn responsive to rotation of the input shaft and the clutch member disengages the drive train at a second lateral position in a second operational mode to disengage the output shaft from rotation of the input shaft. A clutch-drive permanent magnet is supported by one of the opposing ends of the clutch shaft for rotation in unison with the clutch shaft and arranged for applying a magnetic biasing force along the axis of rotation to move the clutch member between the first lateral position and the second lateral position. A field generating arrangement produces a first magnetic field configuration that causes the clutch-drive permanent magnet to move the clutch shaft and, thereby, the clutch member away from the second lateral position to bias the clutch member into the first lateral position, and for producing a second magnetic field configuration that causes the clutch-drive permanent magnet to move the clutch member away from the first lateral position to bias the clutch member into the second lateral position.

In another example, a clutch member is configured to rotate about an axis of rotation. A clutch shaft supports the clutch member for rotation about the axis of rotation and includes a pair of opposing ends. The clutch shaft is further supported for lateral movement along the axis of rotation such that the clutch member cooperates with the drive train at a first lateral position in a first operational mode to cause the output shaft to turn responsive to rotation of the input shaft and disengages from the drive train at a second lateral position in a second operational mode to disengage the output shaft from rotation of the input shaft. A permanent magnet is supported by one of the opposing ends of the clutch shaft and arranged for receiving an external magnetic biasing force along the axis of rotation to selectively move the clutch member between the first lateral position and the second lateral position.

As another example, a drive train at least includes an input shaft and an output shaft. A gear arrangement is configured to rotate about an axis of rotation. A traveling shaft supports the gear arrangement for rotation about the axis of rotation. The traveling shaft includes a pair of opposing ends and is further supported for lateral movement along the axis of rotation such that the gear arrangement serves as a traveling gear arrangement that cooperates with the drive train at a first lateral position in a first operational mode to cause the output shaft to respond in a first way responsive to rotation of the input shaft and to cooperate with the drive train at a second lateral position in a second operational mode to cause the output shaft to respond in a second way responsive to rotation of the input shaft. A permanent magnet is supported by one of the opposing ends of the traveling shaft for moving with the traveling shaft and arranged for applying a magnetic biasing force along the axis of rotation to move the traveling gear arrangement between the first lateral position and the second lateral position. A field generating arrangement produces a first magnetic field configuration that causes the permanent magnet to move the traveling shaft and, thereby, the traveling gear arrangement away from the second lateral position to bias the traveling gear arrangement into the first operational mode with the traveling gear arrangement moved to the first lateral position, and for producing a second magnetic field configuration that causes said permanent magnet to move the traveling gear arrangement away from the first lateral position to bias the traveling gear arrangement into the second operational mode with the traveling gear arrangement moved to the second lateral position.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

FIG. 1 is a diagrammatic illustration, in elevation, of a drive train and clutch arrangement with the clutch arrangement in an engaged position.

FIG. 2 is a diagrammatic illustration, in elevation, of the drive train and clutch arrangement of FIG. 1 with the clutch arrangement in a disengaged position.

FIG. 4a is a diagrammatic side view, in perspective, of another embodiment of an actuator mechanism that is suitable for use with the clutch arrangement of FIGS. 1 and 2.

FIG. 4b is a diagrammatic bottom view, in perspective, of the actuator mechanism of FIG. 4a, shown here to illustrate further details of its structure.

FIGS. 7 and 8 are diagrammatic views, in elevation, of one embodiment of a drive train including a gear shift configuration that is produced according to the present disclosure, where FIG. 7 illustrates a first operational mode and FIG. 8 illustrates a second operational mode.

FIGS. 9 and 10 are diagrammatic views, in elevation, of one embodiment of a drive train including a reversing gear shift configuration that is produced according to the present disclosure, where FIG. 9 illustrates a forward operational mode and FIG. 10 illustrates a reverse operational mode.

FIGS. 11 and 12 are diagrammatic views, in elevation, of one embodiment of a drive train including a clutch arrangement that is produced according to the present disclosure.

DETAILED DESCRIPTION

Figure 3B:
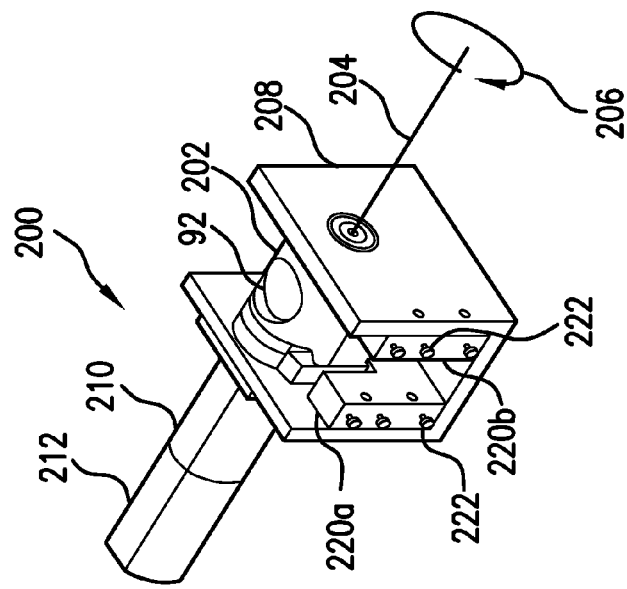
FIG. 3b is a diagrammatic view, in perspective, of the actuator mechanism of FIG. 3a, shown here to illustrate further details of its structure.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiments shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology such as, for example, upper/lower, right/left, front/rear top/bottom, underside and the like may be adopted for purposes of enhancing the reader's understanding, with respect to the various views provided in the figures, and is in no way intended as being limiting.

Turning now to the figures, wherein like components are designated by like reference numbers whenever practical, attention is immediately directed to FIG. 1 which diagrammatically illustrates one embodiment of a clutch arrangement, generally indicated by the reference number 10 and forming part of a drive train 20. In the present example, the clutch arrangement is illustrated in an engaged position. The drive train is driven, for example, by a motor 22 which drives a first gear set 30. The motor may be any suitable type such as, for example, electric, internal combustion and pneumatic. A first gear 32 of the first gear set is driven by a shaft gear 34 of motor 22. A second gear 36 of the first gear set is supported on a first gear set shaft 38, along with first gear 32, for co-rotation with the first gear. Bearings 40 are used to support first gear shaft 38. It should be appreciated that any suitable form of bearing may be used, dependent upon a particular application and in view of this overall disclosure, such that first gear shaft 38 is allowed to rotate freely, while retained along its axis of rotation. Motor 22 rotates shaft gear 34 in an exemplary direction 50, that is indicated by an arrow, to rotate first gear set 30 in an opposing direction 52, indicated by an arrow. Motor shaft gear 34 and first gear 32 may be of any suitable type including, for example, toothed gears such as spur gears and gears having projecting "dog" type teeth. Teeth have not been illustrated on the gears in the figures, since there are alternative configurations in each instance. Further, in some embodiments, such as is the case with motor shaft gear 34 and first gear 32, these gears may be replaced by pulleys which support a suitable flexible belt. In still other embodiments, shaft gear 34 and first gear 32 may be eliminated and the drive shaft of motor 22 may be directly coupled to first gear set shaft 38, as will be further described.

Still referring to FIG. 1, a second gear set 60 can be essentially identical in construction to first gear set 30 having its components indicated by like reference numbers with an appended prime (') mark that has been provided for descriptive clarity. In the present example, first gears 32 and 32' are at least generally aligned in order to engage clutch arrangement 10. The latter includes a first clutch gear 70 and a second clutch gear 72 fixedly supported on a clutch shaft 74. The clutch shaft is, in turn, rotatably supported by bearings 76 along an axis of rotation of the clutch shaft. Any suitable type of bearing may be used as bearings 76, so long as clutch shaft 74 is able to rotate about its axis of rotation as well as being supported for bi-directional lateral movement through a range of positions along the axis of rotation, as indicated by a double-headed arrow 80. For purposes of providing selective lateral movement and biasing of clutch shaft 74, a permanent magnet 90 is supported, for example, by or near one free end of the clutch shaft. Magnet 90 may be attached to the clutch shaft in any suitable manner including, for example, using fasteners, welding or soldering. In some embodiments, the magnet may be at least somewhat isolated from rotation, if so desired, by placing a bearing between the permanent magnet and the clutch shaft. Generally, magnet 90 can be located to provide for balanced rotation by shaft 74 when the magnet rotates in unison with the clutch shaft. In this regard, magnet 90 can be positioned to compensate for an unbalanced condition of clutch shaft 74 and other components rotatably supported thereby. North and south poles of magnet 90 are illustrated, having the north pole facing outward. It should be appreciated that the poles of magnet 90 may be reversed, while maintaining the operational capabilities described herein, and that it is not necessary to precisely align the magnet poles along the axis of rotation of clutch shaft 74 for reasons which will be seen immediately hereinafter.

In the present example, an actuator magnet 92 is a permanent magnet that is arranged having its north pole in a confronting relationship with the north pole of magnet 90 for use in applying a repulsive magnetic biasing force 94 to magnet 90. For this reason, magnet 90 may be referred to as a biasing magnet. In this case, the north pole of actuator magnet 92 repels the north pole of magnet 90 to provide force 94 (indicated by an arrow) on shaft 74, irrespective of any co-rotation of the biasing magnet on shaft 74. It should be appreciated that the magnetic biasing force can be achieved so long as one pole of the actuator magnet is relatively closer to one of the poles of the biasing magnet. That is, if the north and south poles of the biasing magnetic are not aligned on the axis of rotation of shaft 74, the actuator magnet can produce a biasing force so long as the north and south poles of the biasing magnet project onto the axis of rotation of clutch shaft 74 at some offset distance from one another. Likewise, precise alignment of the poles of actuator magnet 92 is not required. The example of FIG. 1 illustrates clutch arrangement 10 in an engaged position, corresponding to an engaged mode of the clutch arrangement, such that second gear 36 of the first gear set rotates first clutch gear 70, thereby causing second clutch gear 72 to rotate first gear 32' of the second gear set. The engaged position is maintained by biasing force 94. It should be appreciated that, if clutch shaft 74, and thereby biasing magnet 90, move in a disengaging direction (i.e., to the left in the view of the figure), the magnitude of biasing force 94 will increase, thereby having a positive influence on maintaining the engaged position in the presence of external events such as, for example, mechanical shock, gravity and the like. As will be described immediately hereinafter, clutch arrangement 10 can be moved to its disengaged position by reorienting actuator magnet 92.

Turning to FIG. 2, in conjunction with FIG. 1, the former illustrates drive train 20 with clutch arrangement 10 in its disengaged position, responsive to an attractive magnetic biasing force 96 (indicated by an arrow) that is achieved, in one manner, by reversing the poles of actuator magnet 92 such that its south pole faces the north pole of biasing magnet 90. The magnetic field may be provided in a number of ways for purposes of presenting like and opposite poles to biasing magnet 90. For example, it is noted that more than one actuator magnet may be utilized, as will be further described below. Irrespective of the source of the actuator magnetic field, upon reversal of the magnet pole that confronts biasing magnet 92, clutch shaft 74 moves laterally to the left from the engaged position of FIG. 1 to the disengaged position of FIG. 2 responsive to biasing force 96. The biasing force serves to further maintain the disengaged position, for example, by resisting external, opposing forces that may be caused by gravity and other accelerative influences.

Referring to FIG. 2, attention is now directed to a number of additional details with respect to the illustrated embodiment. In particular, first clutch gear 70 moves laterally to the disengaged position by an amount that causes it to be completely clear of second gear 36 of the first gear set. Although not required, second clutch gear 72 and first gear 32' of the second gear set can be configured to cooperate in a way which causes these gears to remain engaged or meshed while the overall clutch mechanism remains disengaged. This is accomplished, in the present example, by second clutch gear 72 having a thickness that is sufficient to allow for continuous meshed lateral sliding engagement between second clutch gear 72 and first gear 32', as the clutch arrangement moves between the engaged and the disengaged positions. Accordingly, when the clutch arrangement is moved to its engaged position, it is only necessary for second gear 36 and first clutch gear 70 to mesh on contact. It should be appreciated that maintaining continuous sliding engagement between second clutch gear 72 and first gear 32' can readily be accomplished in a number of different ways including, for example, by configuring first gear 32' with a greater thickness than second clutch gear 72, along with appropriately laterally arranging the gears relative to one another.

Turning again to FIG. 1, as discussed above, any suitable types of gears may be used in clutch arrangement 10, cooperating with the remaining components of drive train 20. Depending upon gear type, it should be appreciated that the clutch arrangement may be subjected to thrust forces that can tend to bias the clutch arrangement to favor either the engaged or the disengaged modes of operation. In such embodiments, the magnetic forces may, at times, necessarily be of a sufficient magnitude to overcome the gear thrust forces. Of course, some types of gears such as, for example, spur gears do not normally generate significant thrust force.

Appropriate stops can be provided in order to avoid clutch arrangement gear faces from rubbing against gear faces in the overall drive train in the engaged position of FIG. 1, as well as to avoid biasing magnet 90 coming into contact with actuator magnet 92 in the disengaged position of FIG. 2. For example, stops 82 may be provided on clutch shaft 74 in any suitable manner such as, for example, in the form of snap rings, integrally formed thrust washers and the like.

Figure 3A:
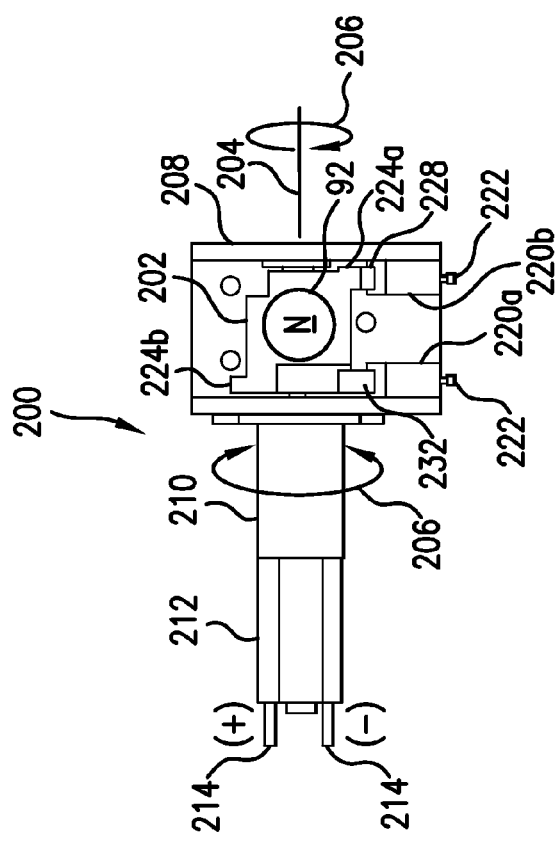
FIG. 3a is a diagrammatic view, in elevation, of one embodiment of an actuator mechanism that is suitable for use with the clutch arrangement of FIGS. 1 and 2.

Turning now to FIGS. 3a and 3b, having described clutch arrangement 10 in detail above, attention is now directed to one embodiment of an actuator mechanism for selectively positioning actuator magnet 92, generally indicated by the reference number 200. FIG. 3a provides a diagrammatic elevational view of the actuator mechanism, while FIG. 3b provides a diagrammatic perspective view. Actuator mechanism 200 includes a housing 202, which may be cylindrical, that supports actuator magnet 92 for rotation about an axis 204, as indicated by an arrow 206, which extends through the magnetic axis of actuator magnet 92 between its north and south poles. It is noted that axis 204 and arrow 206 are also shown in FIG. 1 for purposes of clarity and in one suitable orientation. Bidirectional or unidirectional rotation can be employed for purposes of positioning magnet 92. In the present example, bidirectional rotation is used. Magnet cylinder housing 202 is rotatably supported by a frame 208. The latter also supports a gearbox 210 having an output that is coupled to rotate magnet cylinder housing 202 within frame 208 and having an input (not shown) that is coupled to a motor 212. In the present example, the motor is electrical, although any suitable type of motor may be used. Accordingly, a pair of plus (+) and minus (−) motor electrical terminals 214 (FIG. 3a) is provided for powering the motor. Gearbox 210 can be of a reducing type such that it is not necessary for motor 212 to apply undue amounts of torque, as well as serving to avoid undesired rotation of the magnet when the actuator mechanism is supporting the magnet in a selected biasing position. When actuator mechanism 200 is used as part of clutch assembly 10 of FIGS. 1 and 2, frame 208 of the actuator mechanism can be mounted so as to appropriately support magnet 92 to provided for rotation 206 to selectively place the north and south poles of magnet 92 in a confronting relationship with biasing magnet 90 (FIGS. 1 and 2). Frame 208 additionally supports micro-switches 220a and 220b having terminals 222 that are electrically connectable to appropriate monitoring circuitry.

As shown in FIG. 3a, magnet cylinder housing 202 supports switch actuator extensions 224a and 224b for use in actuating micro-switches 220a and 220b, based on the position of the cylinder housing. In the example of FIG. 3a, a first switch actuator extension 224a is shown engaging a plunger 228 of micro-switch 220b, so as to indicate that magnet 92 is positioned with its north pole oriented as shown, for example, in a confronting relationship with biasing magnet 90, as seen in FIG. 1. Rotation of cylinder housing 202 by 180 degrees will cause second switch actuator extension 224b to engage a plunger 232 of micro-switch 220a, so as to indicate that magnet 92 is positioned with its south pole oriented as shown, for example, in a confronting relationship with biasing magnet 90, as seen in FIG. 2. Cylinder housing 202 can be configured to cooperate with position detecting mechanisms such as, for example, micro-switches in any suitable manner. For example, the cylinder housing can be configured with flats (i.e., recessed areas) to produce disengagement with the micro-switches at appropriate rotational positions of the cylinder. Electrical driving and monitoring circuitry will be discussed at an appropriate point below. It should be appreciated that position detection can be performed in any suitable manner and is not limited to the use of micro-switches. For example, photodetector arrangements may be used in any embodiment. One advantage that is associated with actuator mechanism 200 resides in the fact that it draws no electrical power once it is set to a desired position. Further, the mechanism will remain in the desired position if electrical power is lost, thereby allowing the clutch arrangement to maintain a current operational mode, irrespective of power failure.

Turning now to FIGS. 4a and 4b, attention is now directed to another embodiment, generally indicated by the reference number 300, of an actuator mechanism for selectively exposing biasing magnet 90 of FIGS. 1 and 2 to a selected polarity of magnetic field. FIG. 4a provides a diagrammatic elevational view, in perspective, of the actuator mechanism, while FIG. 4b provides a diagrammatic, bottom view, in perspective. Actuator mechanism 300 includes a frame 302 which supports a magnet arm 304 (FIG. 4a) for rotation about a pivot 306 in a direction that is indicated by an arrow 310. Magnet arm 304 may be pivotally supported in any suitable manner such as, for example, by using a pivot shaft 312 that is received in suitable bearings 314 that are, in turn, supported by frame 302. Magnet arm 304 supports a first actuator magnet 320a and a second actuator magnet 320b. The first and second actuator magnets are oppositely supported by the magnet arm, as seen in FIG. 4a, such that the north pole of magnet 320a is visible, whereas the south pole of magnet 320b is visible. The magnets can be mounted in the magnet arm by any suitable method including, for example, a press fit, threading engagement or through the use of suitable adhesives. Magnet arm 304 further supports a pin 322 that is positioned for actuating paddle arms 324a and 324b of a pair of first and second micro-switches 330a and 330b, respectively.

Still referring to FIGS. 4a and 4b, motor 212 is supported by frame 302, having its output shaft coupled to a gearshaft 340 for rotating a spiral gear 342. Gearshaft 340 includes a distal end 343 (FIG. 4b) that is supported, for example, by a suitable bearing that is received in bracket 302. Spiral gear 342 meshes with a tooth pattern 344 that is defined, for example, by a lower end of magnet arm 304. Tooth pattern 344, in one embodiment, is formed as a series of notches. In another embodiment, the tooth pattern can be formed as part of a separate component and attached to magnet arm 304.

Application of electrical power to terminals 214(+) and 214(−) causes motor 212 to rotate spiral gear 342 which, in turn, causes magnet arm 304 to move in a direction consistent with arrow 310. In this case, polarity of electrical power that is applied to the motor terminals, determines the specific direction of rotation of magnet arm 302. In one position of the magnet arm, the north pole of magnet 320a interacts with biasing magnet 90 of FIG. 1, whereas, in the other position of the magnet arm, the south pole of magnet 320b interacts with biasing magnet 90 of FIG. 1. The two positions of the magnet arm can be established on the basis of actuation of micro-switches 330a and 330b, responsive to movement of the magnet arm. That is, in one position, pin 322 actuates paddle 324b of switch 330b and, in the other position (not shown), pin 322 actuates paddle 324a of switch 330a. Generally, each microswitch, as is the case with any embodiment described herein, can include normally open (NO) and normally closed (NC) contacts for use by an electrical drive arrangement, one suitable embodiment of which will be described hereinafter. It should be appreciated that actuator mechanism 300 shares the advantages of actuator mechanism 200, as described above.

Figure 5:
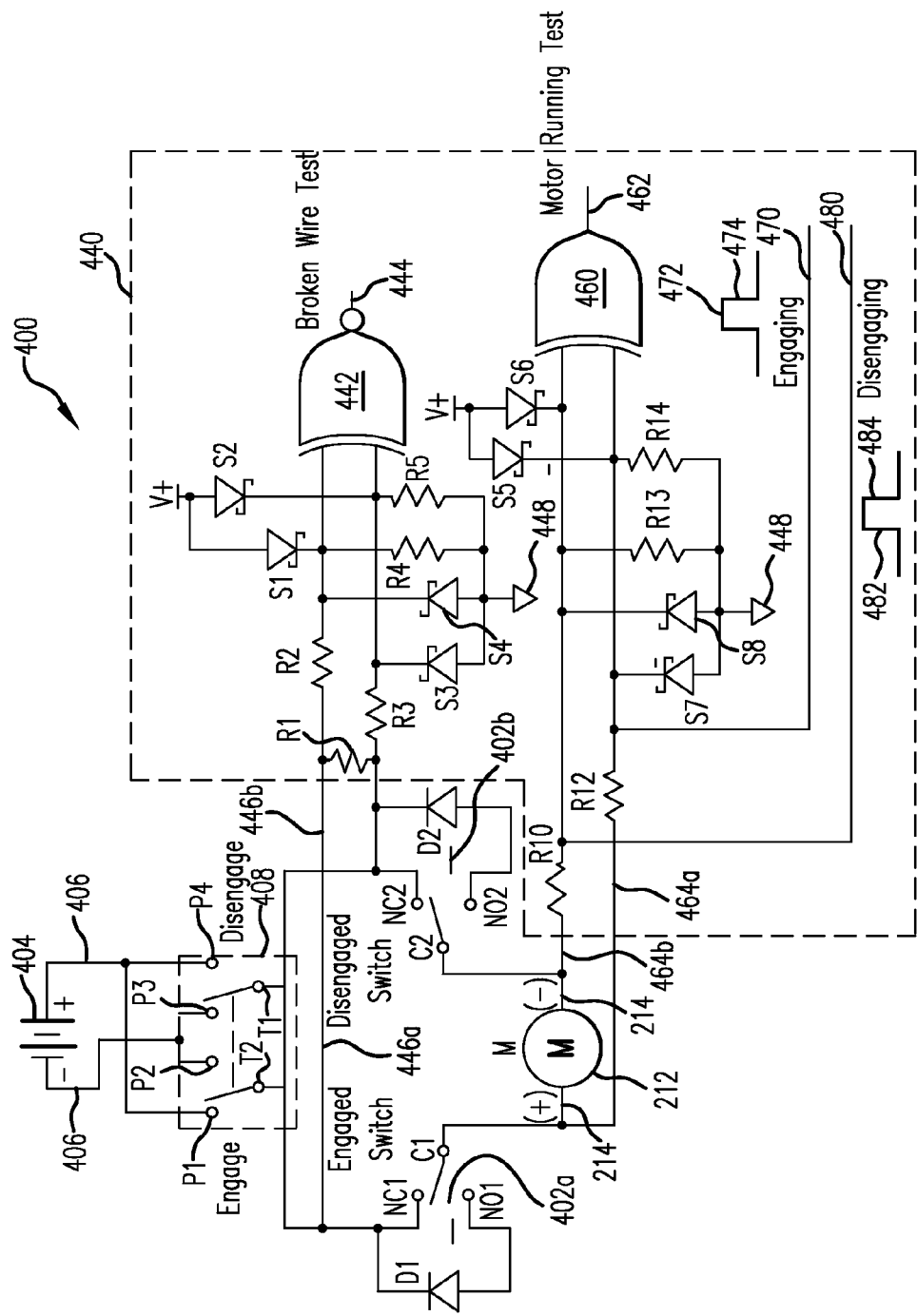
FIG. 5 is a schematic diagram showing one embodiment of an electrical drive arrangement that is suitable for use with the actuator mechanisms of FIGS. 3a and 4a, and further illustrates a status monitoring arrangement.

Referring to FIG. 5, one embodiment of an electrical drive arrangement, generally indicated by the reference number 500, is illustrated that is suitable for use with the actuator mechanisms of FIGS. 3a-b and 4a-b. In the present example, a pair of switches 402a and 402b serve in the manner described above with respect to switches 220a and 220b of FIGS. 3a and 3b and switches 330a and 330b of FIGS. 4a and 4b. Each of switches 402a (serving as an "engaged" switch) and 402b (serving as a "disengaged" switch) includes a common terminal. The NC1 terminals of each switch are normally closed when the switch is not actuated, while the NC2 terminals of each switch are normally open when the switch is actuated. When the actuator mechanism is at an intermediate position, switches 402a and 402b are in the NC1 and NC2 positions, respectively. When the actuator mechanism is in the clutch engaged position, engaged switch 402a is at its NO1 position, while disengaged switch 402b is at its NC2 position. When the actuator mechanism is at its disengaged position, engaged switch 402a is at its NC1 position, while disengaged switch 402b is at its NO2 position. Power is provided, in this embodiment, by a battery 404 which can be a storage battery that provides power to an overall vehicle such as, for example, an automobile or an aircraft. It should be appreciated that any suitable source of power can be provided. Cables 406 extend to a mode control switch 408 that is a double pole double throw switch having terminals P1-P4, T1 and T2, as illustrated. The positive terminal of battery 404 is connected to P4, while the negative terminal of the battery is connected to P1 by cables 406. In one embodiment, switch 408 can be located in the instrument panel of a vehicle, although any suitable location can be used. Terminals P2 and P3 are commonly connected to the negative terminal of battery 404 by cables 406. In an engaged position of mode control switch 408, T1 is connected to the positive terminal of battery 404 and T2 is connected to the negative terminal, whereas in a disengaged position of mode control switch 408, T1 is connected to the negative terminal of battery 404 and T2 is connected to the positive terminal. T1 is, in turn, electrically connected to NC1 of switch 402a, while T2 is electrically connected to NC2 of switch 402b. Common terminal C1 of switch 402a is electrically connected to plus terminal 214 (+) of motor 212, whereas common terminal C2 of switch 402b is connected to the minus terminal 214(−) of motor 212. Diode D1 is connected between NC1 and NO1 of switch 402a, as shown, while Diode D2 is connected between NC2 and NO2 of switch 402b.

Still referring to FIG. 5, when the actuator mechanism is in the disengaged position, disengaged switch 402b is in its NO2 position while engaged switch 402a is in its NC1 position. If mode control switch 408 is moved to the engaged position, current flows through engaged switch 402b to plus terminal 214(+) of the motor. Current flows from minus terminal 214(−) to C2 of disengaged switch 402b. Current then flows to NO2 of the switch and through diode D2 so as to reach T2 and complete the circuit back to battery 404. At some point during rotation of motor 212, disengaged switch 402b changes contact from NO2 to NC2; however, motor 212 will continue rotation to move the actuator mechanism toward the engaged position. Upon reaching the engaged position, engaged switch 402a changes contact from the NC1 terminal to the NO1 terminal, thereby causing motor 212 to stop, with the actuator mechanism at the engaged position. When the mode control switch is now moved to the disengaged position, current flows from the positive terminal of battery 404 to T2 and on to NC2 of disengaged switch 402b. Since the switch is in the NC2 position, current flows to C2 and on to minus terminal 214(−) of motor 212. Current then flows from plus terminal 214(+) to C1 of switch 402a, through D1 and on to the negative terminal of battery 404 via T1 and P2 of mode control switch 408. Consequently, motor 214 rotates the mechanism toward its disengaged position. At some point during this movement, engaged switch 402a transits from the NO1 contact to the NC1 contact, however, movement toward the disengaged position then continues. Again, it is noted that this latter condition corresponds to starting to move to the engaged position from some intermediate position of the actuator mechanism. Upon reaching the disengaged position, disengaged switch 402b transits from the NC2 contact to the NO2 contact, thereby causing motor 212 to stop at the disengaged position. D1 and D2 allow flow of current created by the back electromotive force from the motor, causing a braking action on the rotation.

FIG. 5 further illustrates a monitoring section 440 (shown within a dashed line) which can provide a number of useful indications, although the monitoring section is not required. Monitoring section 440 includes an exclusive nor (XNOR) gate 442 that provides a broken wire or broken power connection indication 444. Operation uses the connection of lines 446a and 446b to NC1 of engaged switch 402a and to NC2 of disengaged switch 402b, respectively. During normal operation, the voltages on NC1 and NC2 should be opposite with respect to one another. Accordingly, the broken wire test indicates any error condition whereby the voltages are essentially the same. Circuitry that interfaces from NC1 and NC2 includes Schottky diodes S1-S4 which clamp lines 446a and 446b with respect to V+ power and power returns that are indicated by triangles 448. Such clamping is useful in the presence of an inductively characterized component, such as motor 212, in order to lessen the opportunity for transient voltage spikes to damage the XNOR gate or any other sensitive electronics. A resistor R1 serves to pull lines 446a and 446b to the same voltage value in the event of one or more open line circuit defects that can occur between battery 404, NC1 and NC2. The disconnect can occur in either the positive current leg, the negative current leg or both. Resistors R2 and R4 serve as one logic level voltage divider which provides one logic level input to XNOR 442. Resistors R3 and R5 serve as another logic level voltage divider which provides another logic level input to the other input of XNOR 442. Again, in this exemplary embodiment, output 444 of the XNOR gate is equivalent to a true logic state, whenever the inputs to the XNOR gate are matched.

An exclusive or (XOR) gate 460 provides a motor running test 462 that is indicative of power being provided to the power terminals of motor 212. Lines 464a and 464b are connected to plus terminal 214(+) and minus terminal 214(−) of the motor, respectively. Schottky diodes S5-S8 serve to clamp lines 446a and 446b with respect to power returns that are indicated by triangles 448. Again, protection is provided by these zener diodes to XOR gate 460, or other sensitive electronics, from inductive transient voltages. Resistor R10 cooperates with resistor R13 as a voltage divider to provide a logic level voltage value to one input of XOR 460 from line 464b, while resistor R12 cooperates with resister R14 to provide a logic level voltage value to the other input of XOR 460 from line 464a. An output indication is provided by XOR 460 whenever the voltages at the motor terminals are opposite with respect to one another, as is the case when the motor is operating. An Engaging line 470 exhibits a pulse 472 as motor 212 drives from a disengaged or intermediate position of the actuator mechanism to the engaged position. A negative going edge 474 of pulse 472 is indicative of the actuator mechanism having reached the engaged position. Accordingly, the negative going edge of pulse 472 can be latched in a known manner to provide an "engaged" indication. Similarly, a Disengaging line 480 exhibits a pulse 482 as motor 212 drives from an engaged or intermediate position of the actuator mechanism to the disengaged position. Accordingly, a negative going edge 484 of pulse 482 can be latched in a known manner to provide a "disengaged" indication.

Figure 6:
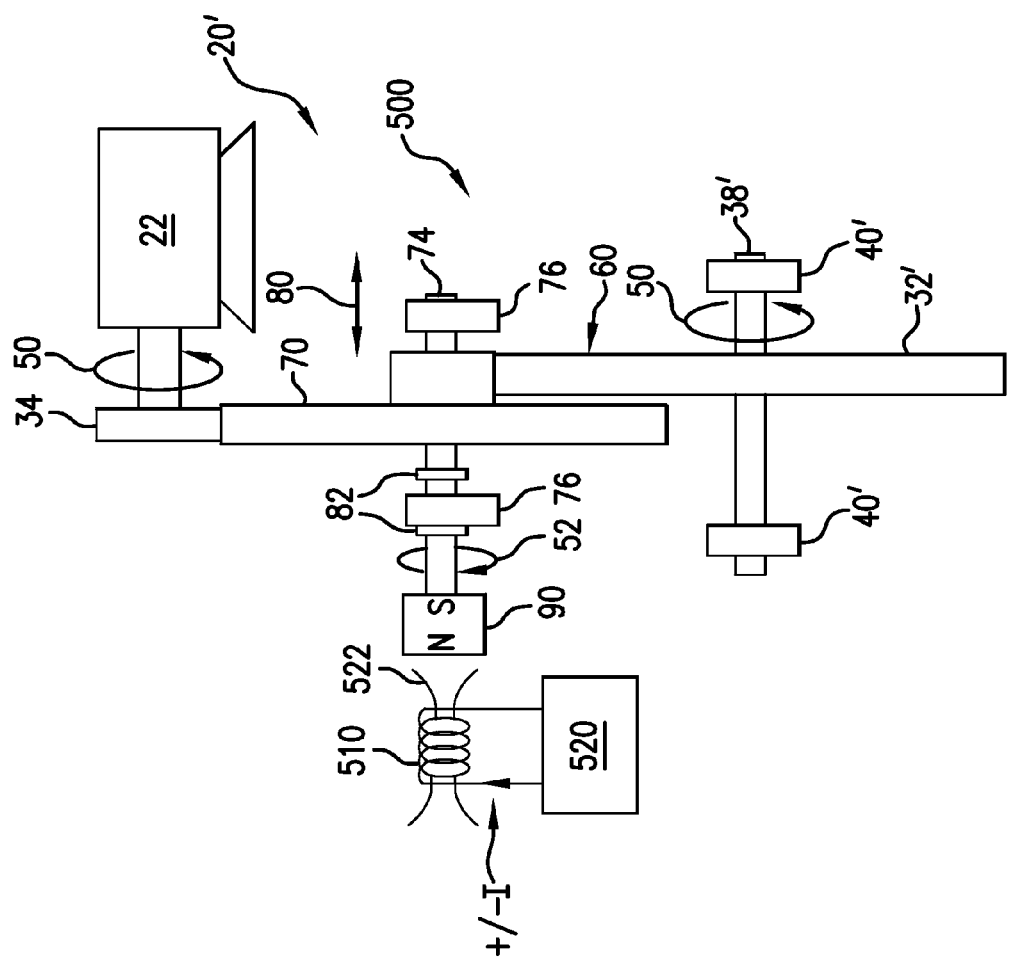
FIG. 6 is a is a diagrammatic illustration, in elevation, of a modified drive train and clutch arrangement with the clutch arrangement in an engaged position and including one embodiment of an electromagnetic actuator mechanism.

Attention is now directed to FIG. 6 which illustrates another embodiment of a clutch arrangement, produced in accordance with the present invention, generally indicated by the reference number 500 and forming part of drive train 20'. It is noted that clutch arrangement 20' is modified in several respects, as compared to clutch arrangement 20 of FIGS. 1 and 2. The rotating components of the clutch assembly, however, can be essentially unchanged, as well as the interaction of the clutch assembly with second gear set 60. Hence, descriptions of these like components and their operation have not been repeated for purposes of brevity. One difference, however, resides in the elimination of first gear set 30 such that motor shaft gear 34 directly engages first clutch gear 70 in the engaged mode of operation that is illustrated by the present figure. In the disengaged mode of operation, first clutch gear 70 moves to the left, as is understood in view of FIG. 2, such that motor shaft gear 34 is free of first clutch gear 70. It should be appreciated that first gear set 30 or any other suitable arrangement may be interposed between the first clutch gear and the motor shaft gear, as needed, and the present figure, as is the case with respect to all of the figures, is intended as descriptive rather than limiting.

Still referring to FIG. 6, modified clutch assembly 20' is provided with an electromagnetic mode selection arrangement having a coil 510 and a controller 520 which provides a coil current that is indicated as +/−I. Controller 520 may be made up of any suitable components and may be as simple as a battery and a switch in a series connection. The switch can be mechanical or electronic. When +I is flowing in coil 510, the coil produces a magnetic field 522 (only a few flux lines of which have been shown) to urge biasing magnet 90, for example, to the right in the view of the figure, to move clutch arrangement 20' to its engaged position and, thereafter, to maintain the engaged position. On the other hand, when −I is caused to flow in coil 510, the coil produces magnetic field 522 with an opposite polarity to attract biasing magnet 90 so as to move the clutch assembly to the left, in the view of FIG. 5, to its disengaged position. Continued application of current can be used to continuously bias the clutch assembly to its disengaged position so as to resist forces such as, for example, external accelerations. Of course, the engaged position can be similarly maintained through the continuous application of current. In some embodiments, there may be no need to continuously apply coil current, once a desired position of the clutch arrangement has been achieved. In other embodiments, gear types may be selected that produce a thrust force which can either tend to move the clutch arrangement into the disengaged position or the engaged position. Application of current I can then be established, based on the introduced thrust forces. In this regard, the magnitude of +I can be different than the magnitude of −I. For example, if +I biases the clutch assembly toward the engaged position, and the gears cooperate to provide a thrust force that also biases the gears to an engaged position, a relatively lower magnitude of current +I can be employed once the engaged position has been achieved. On the other hand, if the thrust force tends to cause disengagement of the clutch arrangement, a relatively higher magnitude of current +I can be used. It should also be appreciated that locking mechanisms can be employed to maintain the engaged and disengaged positions of clutch shaft 74. For example, a latch coil and latch arm can be provided adjacent to the clutch shaft such that lateral movement out of the engaged or disengaged positions is prevented unless the latch coil and latch are operated to disengage with clutch shaft 74. In one embodiment, the latch coil simultaneously receives drive current with clutch coil 510. In a more detailed embodiment, the latch coil and clutch coil can be electrically connected in series.

In view of the foregoing, it can be seen that a clutch shaft, having a pair of opposing ends, supports the clutch gear such as, for example, clutch gear 70 of FIGS. 1 and 2, for rotation about an axis of rotation. The clutch shaft is further supported for lateral movement along the axis of rotation such that the clutch gear is inserted into the drive train at a first lateral position in a first operational mode to cause the output shaft to turn responsive to rotation of the input shaft and removed from the drive train at a second lateral position in a second operational mode to disengage the output shaft from rotation of the input shaft. As will be seen, however, the concepts that have been brought to light herein are not limited to clutch arrangements.

Attention is now directed to FIGS. 7 and 8 which illustrate one embodiment of a transmission arrangement, generally indicated by the reference number 600 and forming part of a drive train 602. It is noted that components such as, for example, bearings and stops have not been shown for purposes of illustrative clarity, but are understood to be present and are considered to be readily provided by one having ordinary skill in the art. A number of components are shared with aforedescribed clutch arrangement 10 and drive train 20. Accordingly, these shared components are designated by like reference numbers and their descriptions have not been repeated for purposes of brevity. In the present example, the first gear set further includes a third gear 604 that is located on first gear set shaft 38 in a spaced apart relationship from second gear 36. A traveling gear shaft 74', previously designated as clutch gear shaft 74 with reference to FIGS. 1 and 2, supports a first transmission gear 70' and a second transmission gear 72', which were previously referred to as first clutch gear 70 and second clutch gear 72. Traveling shaft 74' additionally supports a third transmission gear 606.

Drive train 602 is operable in the mode shown with respect to FIG. 7, which corresponds to the engaged mode of the clutch arrangement of FIG. 1, so as to provide a first gear ratio between the input, motor shaft of motor 22 and second, output gear set shaft 38'.

Referring to FIG. 8, when traveling gear shaft 74' is caused to move to the left in the view of the figure, using magnetic attraction, third gear 604 of the first gear set shaft engages third transmission gear 606. This engagement takes place after second gear 36 of the first gear set disengages from first transmission gear 70'. Once engagement between third gear 604 and third transmission gear 606 takes place, a second gear ratio is provided between the input, motor shaft and second, output gear set shaft 38'. Accordingly, selectable gear ratios have been provided. Any suitable arrangement can be used for purposes of moving, biasing and maintaining the position of traveling shaft 74', via magnet 90, including those described above. Of course, removal of third gear 604 and third transmission gear 606 results in a clutch type arrangement with operation consistent with that of FIGS. 1 and 2. It should be appreciated that any suitable form of actuator may be employed for purposes of biasing magnet 90 including those described above. Further, the aforedescribed transmission arrangement, as well as a reversing configuration, yet to be described, shares the advantages of the clutch arrangement described above, for example, with respect to maintaining an operational mode despite power loss and provides for embodiments that maintain an operational mode with no or little electrical power consumption.

Turning now to FIGS. 9 and 10, one embodiment of a reversible transmission arrangement is illustrated, generally indicated by the reference number 700 and forming part of a drive train 702. A number of components are shared with aforedescribed transmission arrangement 600 and drive train 602. Accordingly, these shared components are designated by like reference numbers and their descriptions have not been repeated for purposes of brevity. In the present example, second transmission gear 72' (FIGS. 7 and 8) has been replaced with a modified transmission gear 704, for reasons which will become evident. Further, a reversing idler arrangement 710 includes a reverse idler shaft 712 that supports a first reverse idler gear 714 and a second reverse idler gear 716. Output shaft 38' additionally supports a reverse gear 718 that continuously meshes with second reverse idler gear 716.

Referring to FIG. 9, in providing a first gear ratio between the input, motor shaft of motor 22 and output shaft 38', the drive train operates in essentially the same manner as drive train 602 and transmission 600 of FIG. 7, with the exception of the rotation of the components of reversing idler arrangement 710.

Referring to FIG. 10, in providing a second gear ratio, however, by using magnet 90 to move traveling shaft 74' to its leftmost position, in the view of the figure, modified transmission gear 704 and first gear 32' of second gear set 60 initially disengage. Thereafter, third transmission gear 606 engages first reverse idler gear 714 which causes reverse gear 718 to rotate output shaft 38' in a reversed direction, as indicated by arrow 52 and in comparison with FIG. 9. It should be appreciated that the first and second gear ratios can be set relative to one another, as desired, with appropriate selection of gears or the first and second gear ratios can be equal, resulting only in reversal of rotation.

Attention is now directed to FIGS. 11 and 12 which illustrate one embodiment of a friction clutch arrangement, generally indicated by the reference number 800 and forming part of a drive train 802. A number of components are shared with aforedescribed embodiments and are designated by like reference numbers. In the present example, shaft gear 34 of motor 22, rotating in direction 50, drives a clutch gear 804 that is supported, for example, by a bushing 810 such that the bushing and clutch gear 804 can co-rotate freely about an axis of rotation 814 on clutch shaft 74 responsive to rotation of shaft gear 34. At the same time, clutch shaft 74 is free to move laterally within bushing 810 along axis 814. Bushing 810, in one embodiment, may be pressed into clutch gear 804, although any suitable form of attachment may be used. Bushing 810 is further supported by a bearing 812, which is diagrammatically shown, to allow for free rotation of the bushing and, therefore, clutch gear 804 while fixing the lateral position of the bushing and clutch gear along axis 814. Bearing 812 may be of any suitable type, as will be appreciated by one having ordinary skill in the art in view of this disclosure. Clutch gear 804 further defines a clutch face 816. A clutch plate 820 is fixedly attached to clutch shaft 74 to rotate in unison therewith and for lateral movement with the clutch shaft. Clutch plate 820 includes a friction surface 822 that is in a confronting relationship with clutch face 816 of the clutch gear. The clutch plate may be integrally formed or may be formed having various functional layers (not shown). For example, a rigid backing plate may support a suitable friction material, as will be familiar to one having ordinary skill in the art. In another embodiment, clutch gear 804 may support a friction material (not shown) that is engaged by the clutch plate or a friction material that is supported by the clutch plate. Stops 82a and 82b are arranged on opposing sides of bearing 76, and may be configured as described above. Biasing magnet 90 is supported on shaft 74 as described above with respect to FIG. 1. Actuator magnet 92 is likewise used in the manner that is described above with respect to FIG. 1. Further, the actuator embodiment of FIGS. 4a and 4b may replace actuator magnet 92. In another embodiment, the actuator magnet can be replace by an electromagnet, for example, in the manner that is illustrated in FIG. 6.

Still referring to FIGS. 11 and 12, a clutch shaft gear 830 is fixedly supported on clutch shaft 74 to rotate in unison with the shaft and to move laterally therewith. The clutch shaft gear is in engagement with an output gear 832 that is fixedly supported on an output shaft 834 that can be used to drive any suitable mechanism either directly or through another gear that is positioned on shaft 834. Output shaft 834 is supported by bearings 40 which can be of any suitable type that allows free rotation of the shaft and capture the shaft with respect to limiting lateral movement. Although not required, output gear 832 and clutch shaft gear 830 can be configured to cooperate in a way which causes these gears to remain engaged or meshed while the clutch mechanism is in the disengaged position of FIG. 11 to allow for continuous meshed lateral sliding engagement between the clutch shaft gear and the output gear. In the present example, output gear 832 has a thickness that is greater than the thickness of clutch shaft gear 830, although this is not a requirement.

Referring to FIG. 11, clutch arrangement 800 is illustrated in a disengaged position in which clutch plate 820 is spaced away from clutch gear 804 as a result of an attractive biasing force 836, indicated using an arrow, that is applied as a result of attraction between biasing magnet 90 and actuator magnet 92. It should be appreciated that the disengaged position of FIG. 11 need only place friction surface 822 of the clutch plate a small distance away from clutch face 816 of the clutch gear sufficient to avoid contact between the opposing surfaces. With the clutch plate in the disengaged position, clutch gear 804 and bushing 810 rotate on clutch shaft 74. It should be appreciated that the use of bushing 810 is considered to be suitable since a no load condition is present with the clutch plate in the disengaged position. In some embodiments, bushing 810 can be replaced by a bearing, for example, if a significant load is experienced when the clutch is disengaged. Lateral travel of the clutch shaft is limited, in this example, by stop 82a in order to avoid contact between biasing magnet 90 and actuator magnet 92.

Referring to FIG. 12, clutch arrangement 800 is illustrated in an engaged position in which friction surface 822 of clutch plate 820 is biased into contact with clutch face 816 of the clutch gear as a result of a repulsive biasing force 838, indicated by an arrow. In the engaged position, clutch plate 820 co-rotates with clutch gear 804 which, in turn, rotate clutch shaft 74 along with clutch shaft gear 830. Accordingly, the clutch shaft gear rotates output gear 832. It should be appreciated that bushing 810 rotates with clutch gear 804 and clutch shaft 74 when the clutch plate is in the engaged position such that bushing 810 experiences minor loading and no relative rotation with respect to clutch shaft 74. As is the case with any friction clutch, the frictional characteristics between friction surface 822 of the clutch plate and clutch face 816 of the clutch gear should be considered as well as anticipated loads in order to establish an appropriate value for biasing force 838. Although stop 82b has been illustrated which limits lateral motion of the clutch plate toward the clutch gear, stop 82b may be optional. This stop may be useful, for example, in avoiding undesired contact with an underlying material as a result of progressive wear of an overlying layer of friction material.

While a number of exemplary aspects and embodiments have been discussed above, those of skill in the art will recognize certain modifications, permutations, additions and sub-combinations thereof. For example, the clutch, reversing and gear shift arrangements described herein can be used as functional blocks in a series where the output shaft of one arrangement serves as the input shaft of the next. Accordingly, the drive arrangements that have been disclosed herein enjoy a wide range of practical applications including, but not limited to transmissions for vehicles, auto-pilots including those for airplanes and helicopters, as well as in robotics applications. It should be appreciated that the foregoing embodiments are not limited to implementation with gears so long as the advantageous actuation concepts that have been brought to light herein are being applied. For example, some embodiments may replace gears with rollers having frictionally engagable surfaces such as, for example, resilient, rubber-like rollers or some combination of resilient and solid rollers. It is therefore intended that the following appended claims and claims hereafter introduced are interpreted to include all such modifications, permutations, additions and sub-combinations as are within their true spirit and scope.

What is claimed is:

1. In a drive train at least including an input shaft and an output shaft, a clutch arrangement comprising:
   a clutch member that is configured to rotate about an axis of rotation;
   a clutch shaft supporting said clutch member for rotation about said axis of rotation and having a pair of opposing ends and said clutch shaft further supported for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;
   a clutch-drive permanent magnet that is mounted on one of said opposing ends of said clutch shaft for rotation in unison with the clutch shaft and arranged for applying a magnetic biasing force along the axis of rotation to move the clutch member between the first lateral position and the second lateral position and said clutch-drive permanent magnet includes a north pole and a south pole that are arranged such that a projection of the north and south poles onto said axis of rotation results in an offset along said axis between projected north and south pole positions; and
   a field generating arrangement for producing a first magnetic field configuration that causes said clutch-drive permanent magnet to move said clutch shaft and, thereby, said clutch member away from the second lateral position to bias the clutch member into said first lateral position, and for producing a second magnetic field configuration that causes said clutch-drive permanent magnet to move said clutch member away from the first lateral position to bias the clutch member into said second lateral position.

2. The arrangement of claim 1 wherein said field generating arrangement includes a second permanent magnet for producing the first and second magnetic field configurations.

3. The arrangement of claim 1 wherein said drive train includes a driven member having an engagement surface and said clutch member is a friction plate having a friction surface that is arranged for contacting the engagement surface in the first operational mode.

4. The arrangement of claim 1 wherein said clutch member is a clutch gear that is inserted into the drive train at said first lateral position and removed from the drive train at the second lateral position.

5. The arrangement of claim 1 wherein said field generating arrangement includes an electromagnetic coil in magnetic communication with said clutch-drive permanent magnet such that a current flow in one direction through the electromagnetic coil produces said first magnetic field configuration and said current flow in an opposite direction produces said second magnetic field configuration.

6. In a drive train at least including an input shaft and an output shaft, a clutch arrangement comprising:
   a clutch member that is configured to rotate about an axis of rotation;
   a clutch shaft supporting said clutch member for rotation about said axis of rotation and having a pair of opposing ends and said clutch shaft further supported for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;
   a clutch-drive permanent magnet that is mounted on one of said opposing ends of said clutch shaft for rotation in unison with the clutch shaft and arranged for applying a magnetic biasing force along the axis of rotation to move the clutch member between the first lateral position and the second lateral position; and
   a field generating arrangement for producing a first magnetic field configuration that causes said clutch-drive permanent magnet to move said clutch shaft and, thereby, said clutch member away from the second lateral position to bias the clutch member into said first lateral position, and for producing a second magnetic field configuration that causes said clutch-drive permanent magnet to move said clutch member away from the first lateral position to bias the clutch member into said second lateral position and said field generating arrangement includes a second permanent magnet for producing the first and second magnetic field configurations and said second permanent magnet includes a second magnet north pole and a second magnet south pole and said field generating arrangement is configured for selectively rotating the second permanent magnet such that a selected one of the second magnet north pole and the second magnet south pole is positionable in a confronting relationship with the first permanent magnet for producing a selected one of the first and second magnetic field configurations and thereby selectively generating a selected one of a force of attraction and a force of repulsion to move said clutch member between the first lateral position and the second lateral position.

7. In a drive train at least including an input shaft and an output shaft, a clutch arrangement comprising:
   a clutch member that is configured to rotate about an axis of rotation;
   a clutch shaft supporting said clutch member for rotation about said axis of rotation and having a pair of opposing ends and said clutch shaft further supported for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;
   a clutch-drive permanent magnet that is mounted on one of said opposing ends of said clutch shaft for rotation in unison with the clutch shaft and arranged for applying a magnetic biasing force along the axis of rotation to move the clutch member between the first lateral position and the second lateral position; and
   a field generating arrangement for producing a first magnetic field configuration that causes said clutch-drive permanent magnet to move said clutch shaft and, thereby, said clutch member away from the second lateral position to bias the clutch member into said first lateral position, and for producing a second magnetic field configuration that causes said clutch-drive permanent magnet to move said clutch member away from the first lateral position to bias the clutch member into said second lateral position and said field generating arrangement includes a first mode permanent magnet for producing the first magnetic field configuration and a second mode permanent magnet for producing the second magnetic field configuration.

8. The arrangement of claim 7 wherein said field generating arrangement includes an actuator for cooperatively moving the first mode permanent magnet and the second mode permanent magnet such that one of the first and second mode permanent magnets is selectively positionable relative to the clutch-drive permanent magnet to produce said first magnetic field configuration and the other one of the first and second mode permanent magnets is selectively positionable relative to the clutch-drive permanent magnet to produce said second magnetic field configuration.

9. In a drive train at least including an input shaft and an output shaft and wherein said drive train includes a first gear and a second gear, a clutch arrangement comprising:
   a clutch gear that is configured to rotate about an axis of rotation;
   a clutch shaft supporting said clutch gear for rotation about said axis of rotation and having a pair of opposing ends and said clutch shaft further supported for lateral movement along said axis of rotation such that the clutch gear cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft such that the clutch gear is inserted into the drive train at said first lateral position and removed from the drive train at the second lateral position and the clutch gear, in said first lateral position, serves as an intermediate gear to mesh with both the first gear and the second gear to transfer rotation of the input shaft to the output shaft and said clutch gear meshes with no more than one of the first gear and the second gear in the second lateral position to disengage rotation of the input shaft from the output shaft;

a clutch-drive permanent magnet that is mounted on one of said opposing ends of said clutch shaft for rotation in unison with the clutch shaft and arranged for applying a magnetic biasing force along the axis of rotation to move the clutch gear between the first lateral position and the second lateral position; and a field generating arrangement for producing a first magnetic field configuration that causes said clutch-drive permanent magnet to move said clutch shaft and, thereby, said clutch gear away from the second lateral position to bias the clutch gear into said first lateral position, and for producing a second magnetic field configuration that causes said clutch-drive permanent magnet to move said clutch gear away from the first lateral position to bias the clutch gear into said second lateral position.

10. The arrangement of claim 9 wherein said clutch gear, said first gear and said second gears are spur gears.

11. The arrangement of claim 9 wherein said clutch gear, said first gear and said second gear are configured to substantially limit production of a thrust force that opposes inserting said clutch gear into the first operational mode.

12. In a drive train at least including an input shaft and an output shaft, a method comprising:

providing a clutch member to rotate about an axis of rotation;

supporting said clutch member for rotation on a clutch shaft about said axis of rotation, said clutch shaft having a pair of opposing ends;

arranging said clutch shaft for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

mounting a clutch-drive permanent magnet on one of said opposing ends of said clutch shaft for rotation in unison with the clutch shaft and arranged for applying a magnetic biasing force along the axis of rotation to move the clutch member between the first lateral position and the second lateral position wherein said clutch-drive permanent magnet includes a north pole and a south pole and arranging said north pole and said south pole such that a projection of the north and south poles onto said axis of rotation results in an offset along said axis between projected north and south pole positions; and configuring a field generating arrangement for producing a first magnetic field configuration that causes said clutch-drive permanent magnet to move said clutch shaft and, thereby, said clutch member away from the second lateral position to magnetically bias the clutch member into said first lateral position, and for producing a second magnetic field configuration that causes said clutch-drive permanent magnet to move said clutch member away from the first lateral position to bias the clutch member into said second lateral position.

13. The method of claim 12 including using a second permanent magnet, as part of said field generating arrangement, for producing the first and second magnetic field configurations.

14. The method of claim 12 including configuring a driven member as part of said drive train to include an engagement surface and further configuring a friction plate having a friction surface to serve as said clutch member and arranging the friction surface for contacting the engagement surface in the first operational mode.

15. The method of claim 12 including said clutch member as a clutch gear that is inserted into the drive train at said first lateral position and removed from the drive train at the second lateral position.

16. The method of claim 12 including configuring said field generating arrangement to include an electromagnetic coil in magnetic communication with said clutch-drive permanent magnet such that a current flow in one direction through the electromagnetic coil produces said first magnetic field configuration and said current flow in an opposite direction produces said second magnetic field configuration.

17. In a drive train at least including an input shaft and an output shaft, a method comprising:

providing a clutch member to rotate about an axis of rotation;

supporting said clutch member for rotation on a clutch shaft about said axis of rotation, said clutch shaft having a pair of opposing ends;

arranging said clutch shaft for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

mounting a clutch-drive permanent magnet on one of said opposing ends of said clutch shaft for rotation in unison with the clutch shaft and arranged for applying a magnetic biasing force along the axis of rotation to move the clutch member between the first lateral position and the second lateral position; and configuring a field generating arrangement for producing a first magnetic field configuration that causes said clutch-drive permanent magnet to move said clutch shaft and, thereby, said clutch member away from the second lateral position to magnetically bias the clutch member into said first lateral position, and for producing a second magnetic field configuration that causes said clutch-drive permanent magnet to move said clutch member away from the first lateral position to bias the clutch member into said second lateral position and including using a second permanent magnet, as part of said field generating arrangement, for producing the first and second magnetic field configurations and said second permanent magnet includes a second magnet north pole and a second magnet south pole; and selectively rotating the second permanent magnet such that a selected one of the second magnet north pole and the second magnet south pole is positionable in a confronting relationship with the first permanent magnet for producing a selected one of the first and second magnetic field configurations and thereby selectively generating a selected one of a force of attraction and a force of repulsion to move said clutch member between the first lateral position and the second lateral position.

18. In a drive train at least including an input shaft and an output shaft, a method comprising:

providing a clutch member to rotate about an axis of rotation;

supporting said clutch member for rotation on a clutch shaft about said axis of rotation, said clutch shaft having a pair of opposing ends;

arranging said clutch shaft for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

mounting a clutch-drive permanent magnet on one of said opposing ends of said clutch shaft for rotation in unison with the clutch shaft and arranged for applying a magnetic biasing force along the axis of rotation to move the clutch member between the first lateral position and the second lateral position; and configuring a field generating arrangement for producing a first magnetic field configuration that causes said clutch-drive permanent magnet to move said clutch shaft and, thereby, said clutch member away from the second lateral position to magnetically bias the clutch member into said first lateral position, and for producing a second magnetic field configuration that causes said clutch-drive permanent magnet to move said clutch member away from the first lateral position to bias the clutch member into said second lateral position and including using a second permanent magnet, as part of said field generating arrangement, for producing the first and second magnetic field configurations and configuring said field generating arrangement to include a first mode permanent magnet for producing the first magnetic field configuration and a second mode permanent magnet for producing the second magnetic field configuration.

19. The method of claim 18 including further configuring said field generating arrangement to include an actuator for cooperatively moving the first mode permanent magnet and the second mode permanent magnet such that one of the first and second mode permanent magnets is selectively positionable relative to the clutch-drive permanent magnet to produce said first magnetic field configuration and the other one of the first and second mode permanent magnets is selectively positionable relative to the clutch-drive permanent magnet to produce said second magnetic field configuration.

20. In a drive train at least including an input shaft and an output shaft, a method comprising:
providing a clutch gear to rotate about an axis of rotation;
supporting said clutch gear for rotation on a clutch shaft about said axis of rotation, said clutch shaft having a pair of opposing ends;
arranging said clutch shaft for lateral movement along said axis of rotation such that the clutch gear cooperates with said drive train at a first lateral position inserted into the drive train in a first operational mode to cause the output shaft to turn responsive to rotation of the input shaft and the clutch gear disengages said drive train at a second lateral position removed from the drive train in a second operational mode to disengage the output shaft from rotation of the input shaft;
configuring a field generating arrangement for producing a first magnetic field configuration that causes said clutch-drive permanent magnet to move said clutch shaft and, thereby, said clutch gear away from the second lateral position to magnetically bias the clutch gear into said first lateral position, and for producing a second magnetic field configuration that causes said clutch-drive permanent magnet to move said clutch gear away from the first lateral position to bias the clutch gear into said second lateral position; and
configuring said drive train to include a first gear and a second gear such that the clutch gear, in said first lateral position, serves as an intermediate gear to mesh with both the first gear and the second gear to transfer rotation of the input shaft to the output shaft and said clutch gear meshes with no more than one of the first gear and the second gear in the second lateral position to disengage rotation of the input shaft from the output shaft.

21. The method of claim 20 including providing said clutch gear, said first gear and said second gears as spur gears.

22. The method of claim 20 including configuring said clutch gear, said first gear and said second to substantially limit production of a thrust force that opposes inserting said clutch gear into the first operational mode.

23. In a drive train at least including an input shaft and an output shaft, a clutch arrangement comprising:
a clutch member that is configured to rotate about an axis of rotation;
a clutch shaft supporting said clutch member for rotation about said axis of rotation and having a pair of opposing ends and said clutch shaft further supported for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft wherein one end of the opposing ends of the clutch shaft is a free end;
a clutch-drive permanent magnet that is mounted on one of said opposing ends of said clutch shaft for rotation in unison with the clutch shaft and arranged for applying a magnetic biasing force along the axis of rotation to move the clutch member between the first lateral position and the second lateral position and said clutch-drive permanent magnet is fixedly attached to said free end; and
a field generating arrangement for producing a first magnetic field configuration that causes said clutch-drive permanent magnet to move said clutch shaft and, thereby, said clutch member away from the second lateral position to bias the clutch member into said first lateral position, and for producing a second magnetic field configuration that causes said clutch-drive permanent magnet to move said clutch member away from the first lateral position to bias the clutch member into said second lateral position.

24. The arrangement of claim 23 wherein said clutch-drive permanent magnet includes opposing north and south poles and said clutch shaft supports the clutch drive permanent magnet with one of the north and south poles facing outward with respect to the free end of the clutch shaft and the other one of the north and south poles facing the free end of the clutch shaft.

25. The arrangement of claim 24 wherein said clutch-drive permanent drive magnet is positioned to compensate for an unbalanced condition of the clutch shaft provide for balanced rotation of the clutch shaft.

26. For use in a drive train at least including an input shaft and an output shaft, a clutch arrangement comprising:
a clutch member that is configured to rotate about an axis of rotation;
a clutch shaft supporting said clutch member for rotation about said axis of rotation and having a pair of opposing ends and said clutch member is further supported for lateral movement along said axis of rotation such that the clutch member cooperates with said drive train at a first lateral position in a first operational mode to cause the output shaft to turn responsive to rotation of the input shaft and is disengaged from said drive train at a second lateral position in a second operational mode to disengage the output shaft from rotation of the input shaft wherein one end of the opposing ends of the clutch shaft is a free end; and a permanent magnet that is mounted on one of the opposing ends of the clutch shaft and arranged for receiving an external magnetic biasing force along the axis of rotation to selectively move the clutch member between the first lateral position and the second lateral position and said clutch-drive permanent magnet is fixedly attached to said free end.

27. The arrangement of claim 26 wherein said clutch-drive permanent magnet includes opposing north and south poles and said clutch shaft supports the clutch drive permanent magnet with one of the north and south poles facing outward with respect to the free end of the clutch shaft and the other one of the north and south poles facing the free end of the clutch shaft.

28. The arrangement of claim 27 wherein said clutch-drive permanent drive magnet is positioned to compensate for an unbalanced condition of the clutch shaft and provide for balanced rotation of the clutch shaft.

29. In a drive train at least including an input shaft and an output shaft, a method comprising:

providing a clutch member to rotate about an axis of rotation;

supporting said clutch member for rotation on a clutch shaft about said axis of rotation, said clutch shaft having a pair of opposing ends wherein one end of the opposing ends of the clutch shaft is a free end; arranging said clutch shaft for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

mounting a clutch-drive permanent magnet on one of said opposing ends of said clutch shaft for rotation in unison with the clutch shaft and arranged for applying a magnetic biasing force along the axis of rotation to move the clutch member between the first lateral position and the second lateral position and said mounting fixedly attaches clutch-drive permanent magnet to said free end; and configuring a field generating arrangement for producing a first magnetic field configuration that causes said clutch-drive permanent magnet to move said clutch shaft and, thereby, said clutch member away from the second lateral position to magnetically bias the clutch member into said first lateral position, and for producing a second magnetic field configuration that causes said clutch-drive permanent magnet to move said clutch member away from the first lateral position to bias the clutch member into said second lateral position.

30. The method of claim 29 wherein said clutch-drive permanent magnet includes opposing north and south poles and said supporting arranges the clutch drive permanent magnet on the clutch shaft with one of the north and south poles facing outward with respect to the free end of the clutch shaft and the other one of the north and south poles facing the free end of the clutch shaft.

31. The method of claim 30 including locating the clutch-drive permanent drive magnet on one end of the clutch shaft to balance an unbalanced condition of the clutch shaft to provide for balanced rotation of the clutch shaft.

32. In a drive train at least including an input shaft and an output shaft, an apparatus comprising:

a gear arrangement including at least one gear that is configured to rotate about an axis of rotation;

a traveling shaft supporting said gear arrangement for rotation about said axis of rotation and having a pair of opposing ends and said traveling shaft further supported for lateral movement along said axis of rotation such that the gear arrangement serves as a traveling gear arrangement that cooperates with the drive train at a first lateral position in a first operational mode to cause the output shaft to respond in a first way responsive to rotation of the input shaft and to cooperate with the drive train at a second lateral position in a second operational mode to cause the output shaft to respond in a second way responsive to rotation of the input shaft wherein one end of the opposing ends of the traveling shaft is a free end;

a permanent magnet that is mounted on one of said opposing ends of said traveling shaft for moving with the traveling shaft and arranged for applying a magnetic biasing force along the axis of rotation to move the traveling gear arrangement between the first lateral position and the second lateral position and said clutch-drive permanent magnet is fixedly attached to said free end; and a field generating arrangement for producing a first magnetic field configuration that causes said permanent magnet to move said traveling shaft and, thereby, said traveling gear arrangement away from the second lateral position to bias the traveling gear arrangement into said first operational mode with the traveling gear arrangement moved to said first lateral position, and for producing a second magnetic field configuration that causes said permanent magnet to move said traveling gear arrangement away from the first lateral position to bias said traveling gear arrangement into said second operational mode with the traveling gear arrangement moved to said second lateral position.

33. The arrangement of claim 32 wherein said clutch-drive permanent magnet includes opposing north and south poles and said traveling shaft supports the clutch drive permanent magnet with one of the north and south poles facing outward with respect to the free end of the traveling shaft and the other one of the north and south poles facing the free end of the traveling shaft.

34. The arrangement of claim 33 wherein said clutch-drive permanent drive magnet is positioned to compensate for an unbalanced condition of the traveling shaft to provide for balanced rotation of the traveling shaft.

35. In a drive train at least including an input shaft and an output shaft, a method comprising:

providing a gear arrangement that is configured to rotate about an axis of rotation;

supporting the gear arrangement for rotation about said axis of rotation using a traveling shaft having a pair of opposing ends and further supporting said traveling shaft for lateral movement along said axis of rotation such that the gear arrangement serves as a traveling gear arrangement that cooperates with the drive train at a first lateral position in a first operational mode to cause the output shaft to respond in a first way responsive to rotation of the input shaft and cooperates with the drive train at a second lateral position in a second operational mode to cause the output shaft to respond in a second way responsive to rotation of the input shaft wherein one end of the opposing ends of the traveling shaft is a free end;

mounting a permanent magnet on one of said opposing ends of said traveling shaft to move and rotate in unison with the traveling shaft and for applying a magnetic biasing force along the axis of rotation to move the traveling gear arrangement between the first lateral position and the second lateral position and said mounting includes fixedly attaching said clutch-drive permanent magnet to said free end; and producing a first magnetic field configuration that causes said permanent magnet to move said traveling shaft and, thereby, said traveling gear arrangement away from the second lateral position to bias the traveling gear arrangement into said first operational mode with the traveling gear arrangement moved to said first lateral position, and producing a second magnetic field configuration that causes said permanent magnet to move said traveling gear arrangement away from the first lateral position to bias said traveling gear arrangement into said second operational mode with the traveling gear arrangement moved to said second lateral position.

36. The method of claim 35 wherein said clutch-drive permanent magnet includes opposing north and south poles and said supporting arranges the clutch drive permanent magnet on the traveling shaft with one of the north and south poles facing outward with respect to the free end of the traveling shaft and the other one of the north and south poles facing the free end of the traveling shaft.

37. In a drive train at least including an input shaft and an output shaft, a clutch arrangement comprising:

a clutch member that is configured to rotate about an axis of rotation;

a clutch shaft supporting said clutch member for rotation about said axis of rotation and having a pair of opposing ends and said clutch shaft further supported for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

a clutch-drive permanent magnet that is mounted on one of said opposing ends of said clutch shaft for rotation in unison with the clutch shaft and arranged for applying a magnetic biasing force along the axis of rotation to move the clutch member between the first lateral position and the second lateral position; and a field generating arrangement for producing a first magnetic field configuration that causes said clutch-drive permanent magnet to move said clutch shaft and, thereby, said clutch member away from the second lateral position to bias the clutch member into said first lateral position, and for producing a second magnetic field configuration that causes said clutch-drive permanent magnet to move said clutch member away from the first lateral position to bias the clutch member into said second lateral position wherein said field generating arrangement includes a first mode permanent magnet for producing the first magnetic field configuration and a second mode permanent magnet for producing the second magnetic field configuration and an actuator for cooperatively moving the first mode permanent magnet and the second mode permanent magnet such that one of the first and second mode permanent magnets is selectively positionable relative to the clutch-drive permanent magnet to produce said first magnetic field configuration and the other one of the first and second mode permanent magnets is selectively positionable relative to the clutch-drive permanent magnet to produce said second magnetic field configuration and wherein said actuator includes a magnet arm that supports the first mode permanent magnet and the second mode permanent magnet and the actuator is configured for using electrical power for selectively moving the magnet arm between (i) a first position in which one of the first mode permanent magnet and the second mode permanent magnet produces the first magnetic field configuration and (ii) a second position in which the other one of first mode permanent magnet and the second mode permanent magnet produces the second magnetic field configuration such that the actuator maintains a current one of either of the first position and the second position to, in turn, maintain a current one of the first magnetic field configuration and the second magnetic field configuration irrespective of a failure of said electrical power to the actuator at said first position and said second position of the magnet arm.

38. In a drive train at least including an input shaft and an output shaft, a method comprising:

providing a clutch member to rotate about an axis of rotation;

supporting said clutch member for rotation on a clutch shaft about said axis of rotation, said clutch shaft having a pair of opposing ends;

arranging said clutch shaft for lateral movement along said axis of rotation such that the clutch member cooperates with said drive train at a first lateral position in a first operational mode to cause the output shaft to turn responsive to rotation of the input shaft and the clutch member disengages said drive train at a second lateral position in a second operational mode to disengage the output shaft from rotation of the input shaft;

mounting a clutch-drive permanent magnet on one of said opposing ends of said clutch shaft for rotation in unison with the clutch shaft and arranged for applying a magnetic biasing force along the axis of rotation to move the clutch member between the first lateral position and the second lateral position; and configuring a field generating arrangement for producing a first magnetic field configuration that causes said clutch-drive permanent magnet to move said clutch shaft and, thereby, said clutch member away from the second lateral position to magnetically bias the clutch member into said first lateral position, and for producing a second magnetic field configuration that causes said clutch-drive permanent magnet to move said clutch member away from the first lateral position to bias the clutch member into said second lateral position and configuring said field generating arrangement to include a first mode permanent magnet for producing the first magnetic field configuration and a second mode permanent magnet for producing the second magnetic field configuration and further configuring said field generating arrangement to include an actuator for cooperatively moving the first mode permanent magnet and the second mode permanent magnet such that one of the first and second mode permanent magnets is selectively positionable relative to the clutch-drive permanent magnet to produce said first magnetic field configuration and the other one of the first and second mode permanent magnets is selectively positionable relative to the clutch-drive permanent magnet to produce said second magnetic field configuration and configuring said actuator to include a magnet arm that supports the first mode permanent magnet and the second mode permanent magnet and the actuator is configured for using electrical power for selectively moving the magnet arm between (i) a first position in which one of the first mode permanent magnet and the second mode permanent magnet produces the first magnetic field configuration and (ii) a second position in which the other one of first mode permanent magnet and the second mode permanent magnet produces the second magnetic field configuration such that the actuator maintains a current one of either of the first position and the second position to, in turn, maintain a current one of the first magnetic field configuration and the second magnetic field configuration irrespective of a failure of said electrical power to the actuator at said first position and said second position of the magnet arm.

* * * * *